United States Patent
Ohno et al.

(10) Patent No.: US 6,745,119 B2
(45) Date of Patent: Jun. 1, 2004

(54) IGNITION TIMING CONTROL SYSTEM AND METHOD, AND ENGINE CONTROL UNIT FOR INTERNAL COMBUSTION ENGINE

(75) Inventors: Tetsuya Ohno, Saitama-ken (JP); Hiroshi Yatani, Saitama-ken (JP); Tatsuya Shiraki, Saitama-ken (JP); Yoshihiro Katagiri, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/218,664

(22) Filed: Aug. 15, 2002

(65) Prior Publication Data

US 2003/0045993 A1 Mar. 6, 2003

(30) Foreign Application Priority Data

Aug. 29, 2001 (JP) ........................................ 2001-259369

(51) Int. Cl.$^7$ ................................................. F02D 5/15
(52) U.S. Cl. .................. 701/110; 123/406.51; 123/399; 477/110
(58) Field of Search ................................ 701/110, 114, 701/115, 102; 477/100, 110, 111; 123/406.44, 406.47, 406.51, 406.52, 399, 361

(56) References Cited

U.S. PATENT DOCUMENTS

| | | | | |
|---|---|---|---|---|
| 3,753,377 A | * | 8/1973 | General | ..................... 477/100 |
| 4,729,358 A | * | 3/1988 | Morita et al. | .......... 123/406.47 |
| 4,981,126 A | * | 1/1991 | Kurihara | ................. 123/406.51 |
| 5,681,239 A | | 10/1997 | Toukura | ..................... 477/107 |
| 6,213,913 B1 | * | 4/2001 | Hirakata et al. | ............. 477/111 |

FOREIGN PATENT DOCUMENTS

| | | |
|---|---|---|
| DE | 4 0 09 791 A1 | 10/1991 |
| EP | 0 315 171 A2 | 5/1989 |
| EP | 0 690 225 A2 | 1/1996 |

* cited by examiner

*Primary Examiner*—Hieu T. Vo
(74) *Attorney, Agent, or Firm*—Arent Fox PLLC

(57) ABSTRACT

An ignition timing control system and method, and an engine control unit for an internal combustion engine, which are capable of setting optimum timing for execution of retardation of ignition timing when a vehicle on which the engine is installed is accelerated, thereby effectively reducing longitudinal vibrations of the vehicle, and maintaining acceleration performance. An acceleration demand-detecting module detects a demand of acceleration of the engine. A rotational speed-detecting module detects a rotational speed of the engine. A rotational variation amount-calculating module calculates a variation amount of the rotational speed of the engine. A rotational variation amount differential value-calculating module calculates a differential value of the variation amount of the rotational speed of the engine. A retard amount-calculating module calculates a retard amount for retarding the ignition timing. A retardation execution module executes retardation of the ignition timing by the retard amount on predetermined conditions.

20 Claims, 11 Drawing Sheets

| NGR | 1 (1st) | 2 (2nd) | 3 (3rd) | 4 (4th) | 5 (5th) | 6 (6th) |
|---|---|---|---|---|---|---|
| KGR | #KGR1 | #KGR2 | #KGR3 | #KGR4 | #KGR5 | #KGR6 |

IGNITION TIMING CONTROL SYSTEM AND METHOD, AND ENGINE CONTROL UNIT FOR INTERNAL COMBUSTION ENGINE

BACKGROUND OF THE INVENTION

1. Field of the Invention

This invention relates to an ignition timing control system and method and an engine control unit for an internal combustion engine, and more particularly to an ignition timing control system and method and an engine control unit of this kind, for retarding ignition timing so as to reduce longitudinal vibrations of an automotive vehicle caused by steep changes in torque during acceleration.

2. Description of the Prior Art

When an automotive vehicle is accelerated, driving wheels cannot follow up a sudden increase in torque of an internal combustion engine, so that a drive system for transmitting torque from the engine to the driving wheels, particularly, a drive shaft, undergoes torsion. Although the displacement of the engine caused by the torsion is absorbed by a mount via which the engine is installed on the vehicle, this can bring about acceleration-caused fluctuations in the rotational speed of the engine, thereby producing longitudinal vibrations of the vehicle. Such longitudinal vibrations of the vehicle detriment the feeling of acceleration and impair running stability of the vehicle. As a solution to this problem, the technique of reducing the longitudinal vibrations of the vehicle by retardation of ignition timing has been conventionally known, and proposed e.g. in Japanese Utility Model Registration Publication No. 2548648.

The proposed ignition timing control system judges that the vehicle is in rapid acceleration when the opening degree of a throttle valve of the engine is sharply increased, and an initial value of a retard amount of ignition timing is set according to the rotational speed of the engine and the vehicle speed. The retardation of ignition timing is immediately started by the thus set initial value of the retard amount, and the retard amount is progressively decreased therefrom. Further, the retardation of ignition timing is continued over a predetermined time period, and when it is terminated, if the rotational speed of the engine is decreasing, the ignition timing is advanced, inversely. Thus, the proposed ignition timing control system suppresses the longitudinal vibrations of the vehicle by reducing steep changes in torque during acceleration, and at the same time maintains acceleration performance.

However, the conventional ignition timing control system necessarily executes the retardation of ignition timing when the opening degree of the throttle valve is sharply increased from a small opening degree condition, irrespective of whether the actual changes in torque are large or small. Therefore, for example, even when the torque of the engine does not actually change so sharply and the acceleration-caused fluctuations in the rotational speed of the engine are small, causing almost no longitudinal variations of the vehicle, the retardation of ignition timing is executed, only to degrade the acceleration performance. Further, since the ignition timing is advanced if the engine rotational speed is decreasing at the termination of the retardation, this may cause knocking, and hence damage to the engine. Further, since the retard amount is simply set according the rotational speed of the engine and the vehicle speed, this cannot set the optimum retard amount suitable for operating conditions of the engine and the vehicle.

SUMMARY OF THE INVENTION

It is an object of the invention to provide an ignition timing control system and method and an engine control unit for an internal combustion engine, which are capable of setting optimum timing for execution of retardation of ignition timing when a vehicle on which the engine is installed is accelerated, thereby effectively reducing longitudinal vibrations of the vehicle, which might be caused by changes in torque, and maintaining acceleration performance.

To attain the above object, according to a first aspect of the present invention, there is provided an ignition timing control system for an internal combustion engine, for retarding ignition timing during acceleration, the ignition timing control system comprising:

acceleration demand-detecting means for detecting a demand of acceleration of the engine;

rotational speed-detecting means for detecting a rotational speed of the engine;

rotational variation amount-calculating means for calculating a variation amount of the rotational speed of the engine, based on the detected rotational speed of the engine;

rotational variation amount differential value-calculating means for calculating a differential value of the variation amount of the rotational speed of the engine, based on the calculated variation amount of the rotational speed of the engine;

retard amount-calculating means for calculating a retard amount for retarding the ignition timing; and retardation execution means for executing retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

According to this ignition timing control system, the retard amount-calculating means calculates a retard amount for retarding the ignition timing. Further, the ignition timing is retarded by the retard amount, on condition that the demand of the acceleration is detected, that the variation amount of the rotational speed of the engine is larger than a predetermined amount, and that the differential value of the variation amount of the rotational speed of the engine is smaller than a predetermined value. The timing of execution of retardation of the ignition timing is determined based on the variation amount of the rotational speed of the engine and the differential value of the variation amount of the rotational speed of the engine for the following reason:

As described hereinabove, the longitudinal vibrations of the vehicle cased by acceleration-caused fluctuations in the rotational speed of the engine during acceleration of the vehicle are due to incapability of the driving wheels following up a sudden increase in torque of the engine. This causes changes in the ratio of transmission of torque from the engine to the driving wheels, whereby periodical changes occur in the driving force acting on the driving wheels, such that the relationship between the torque of the engine and the driving wheel-driving force fluctuates with respect to the 1:1 relationship under a constant speed condition of the vehicle. More specifically, when the ratio of transmission of torque of the engine to the driving wheels lowers, a reaction occurs to the engine with a magnitude corresponding to the lowering of the ratio of torque transmission, causing a steep increase in the rotational speed of the engine, whereby the rotational variation is increased. Then, the increased rotational speed causes a rebound of an increase in the vehicle-driving force, and this causes a decrease in the engine rotational speed or the degree of increase in the same as a reaction, whereby the rotational variation is dropped. Thus, the rotational variation (variation amount of the rotational speed) of the engine changes such that it decreases with increase in the vehicle-driving force, and increases with decrease in the same, exhibiting anti-phase relationship to the vehicle-driving force. The cause of generation of the longitudinal vibrations of the vehicle is nothing other than the variation or fluctuations in the vehicle-driving force. Therefore, if the increase in the vehicle-driving force is suppressed, the decrease in the vehicle-driving force as a reaction to the increase can also be suppressed, whereby the longitudinal vibrations of the vehicle can be effectively suppressed.

From the above viewpoint, according to the present invention, when the variation amount of the rotational speed of the engine is larger than the predetermined amount, and at the same time the differential value of the variation amount of the rotational speed of the engine is smaller than the predetermined value, e.g. when the rotational speed is increasing and the variation amount of the rotational speed is decreasing, the ignition timing is retarded by the retard amount. This makes it possible to reduce the torque of the engine in the optimum timing when the vehicle-driving force is increasing. Therefore, the fluctuations in the vehicle-driving force as the cause of acceleration-caused fluctuations in the rotational speed of the engine can be effectively suppressed, whereby the longitudinal vibrations of the vehicle can be effectively suppressed without impairing the acceleration performance.

Preferably, the ignition timing control system further comprises retardation-stopping means for stopping retardation of the ignition timing by the retard amount, on condition that the variation amount of the rotational speed of the engine is smaller than the predetermined amount, and that the differential value of the variation amount of the rotational speed of the engine is larger than the predetermined value.

According to this preferred embodiment, e.g. when the rotational speed of the engine is decreasing, and at the same time the variation amount of the rotational speed of the engine is increasing, the retardation of ignition timing by the retard amount is stopped. This makes it possible to avoid unnecessary reduction of torque of the engine, whereby the vehicle can deliver high acceleration performance. In this case, the ignition timing is only stopped from being retarded, but not accelerated, which positively prevents occurrence of knocking.

The engine has a transmission connected thereto, and it is preferred that the ignition timing control system further comprises transmission gear ratio-detecting means for detecting a transmission gear ratio of the transmission, and the retard amount-calculating means calculates the retard amount according to the rotational speed of the engine and the detected transmission gear ratio.

As the rotational speed of the engine is higher, the acceleration-caused fluctuations in the rotational speed of the engine are more liable to increase, since the higher the rotational speed of the engine, the larger the torque. Further, as the transmission gear ratio is smaller, the acceleration-caused fluctuations in the rotational speed of the engine are more liable to increase, since as the transmission gear ratio is smaller, the torque is more directly transmitted from the engine to the driving wheels, causing an increase of reaction from the driving wheels when the vehicle is rapidly accelerated. Therefore, by setting the retard amount according to the rotational speed of the engine and the transmission gear ratio, e.g. such that the retard amount is set to a larger amount as the rotational speed is larger and as the transmission gear ratio is smaller, the amount of reduction of torque of the engine by the retardation of ignition timing can be properly controlled according to the degree of acceleration-caused fluctuations in the rotational speed of the engine. As a result, the fluctuations in the vehicle-driving force and the longitudinal vibrations of the vehicle caused thereby can be more appropriately suppressed.

The engine includes a throttle valve, and an accessory driven by the engine, and it is preferred that the ignition timing control system further comprises throttle opening-detecting means for detecting an opening degree of the throttle valve, and accessory operating state-detecting means for detecting an operating state of the accessory, and that the retard amount-calculating means calculates the retard amount further according to at least one of the opening degree of the throttle valve and the operating state of the accessory.

The degree of acceleration-caused fluctuations in the rotational speed of the engine also varies with the opening degree of the throttle valve, that is, the former is larger as the latter is larger, since the larger the opening degree of the throttle valve, the larger the torque of the engine. Therefore, by setting the retard amount according to the opening degree of the throttle valve, the amount of reduction of torque of the engine by the retardation of ignition timing can be even more properly controlled according to the degree of acceleration-caused fluctuations in the rotational speed of the engine, whereby the longitudinal vibrations of the vehicle caused thereby can be even more appropriately suppressed. Further, by setting the retard amount according to the operating state of the accessory, it is possible to secure the torque of the engine more appropriately in a fashion coping with an increase in load on the engine caused by operation of the accessory.

Further preferably, the retard amount-calculating means includes initial retard amount-calculating means for calculating the retard amount such that a value of the retard amount for an initial stage of execution of the acceleration-dependent retardation is made different from values of the retard amount for stages of the execution of the acceleration-dependent retardation other than the initial stage.

According to this preferred embodiment, e.g. by setting a value of the retard amount for an initial stage of retardation of ignition timing to a larger value than values for other stages than the initial stage, it is possible to more effectively and speedily control the longitudinal vibrations of the vehicle. Alternatively, if a higher priority is desired to be given to the feeling of acceleration, the value of the retard amount for the initial stage can be set to a smaller value.

To attain the above object, according to a second aspect of the invention, there is provided an ignition timing control system for an internal combustion engine, for retarding ignition timing during acceleration, the ignition timing control system comprising:
an acceleration demand-detecting module for detecting a demand of acceleration of the engine;
a rotational speed-detecting module for detecting a rotational speed of the engine;
a rotational variation amount-calculating module for calculating a variation amount of the rotational speed of the engine, based on the detected rotational speed of the engine;
a rotational variation amount differential value-calculating module for calculating a differential value of the variation amount of the rotational speed of the engine, based on the calculated variation amount of the rotational speed of the engine;

a retard amount-calculating module for calculating a retard amount for retarding the ignition timing; and a retardation execution module for executing retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

This ignition timing control system according to the second aspect of the invention provides the same advantageous effects as provided by the ignition timing control system according to the first aspect of the invention.

Preferably, the ignition timing control system further comprises a retardation-stopping module for stopping retardation of the ignition timing by the retard amount, on condition that the variation amount of the rotational speed of the engine is smaller than the predetermined amount, and that the differential value of the variation amount of the rotational speed of the engine is larger than the predetermined value.

The engine has a transmission connected thereto, and it is preferred that the ignition timing control system further comprises a transmission gear ratio-detecting module for detecting a transmission gear ratio of the transmission, and that the retard amount-calculating module calculates the retard amount according to the rotational speed of the engine and the detected transmission gear ratio.

The engine includes a throttle valve, and an accessory driven by the engine, and it is more preferred that the ignition timing control system further comprises a throttle opening-detecting module for detecting an opening degree of the throttle valve, and an accessory operating state-detecting module for detecting an operating state of the accessory, and that the retard amount-calculating module calculates the retard amount further according to at least one of the opening degree of the throttle valve and the operating state of the accessory.

Further preferably, the retard amount-calculating module includes an initial retard amount-calculating module for calculating the retard amount such that a value of the retard amount for an initial stage of execution of the acceleration-dependent retardation is made different from values of the retard amount for stages of the execution of the acceleration-dependent retardation other than the initial stage.

According to these preferred embodiments, the same advantageous effects as provided by the corresponding embodiments of the ignition timing control system according to the first aspect of the invention, respectively, can be obtained.

To attain the above object, according to a third aspect of the invention, there is provided an ignition timing control method for retarding ignition timing of an internal combustion engine, during acceleration, the ignition timing control method comprising the steps of:

detecting a demand of acceleration of the engine;

detecting a rotational speed of the engine;

calculating a variation amount of the rotational speed of the engine, based on the detected rotational speed of the engine;

calculating a differential value of the variation amount of the rotational speed of the engine, based on the calculated variation amount of the rotational speed of the engine;

calculating a retard amount for retarding the ignition timing; and executing retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

This ignition timing control method according to the third aspect of the invention provides the same advantageous effects as provided by ignition timing control system according to the first aspect of the invention.

Preferably, the ignition timing control method further comprises the step of stopping retardation of the ignition timing by the retard amount, on condition that the variation amount of the rotational speed of the engine is smaller than the predetermined amount, and that the differential value of the variation amount of the rotational speed of the engine is larger than the predetermined value.

Preferably, the ignition timing control method further comprises the step of detecting a transmission gear ratio of a transmission connected to the engine, and the step of calculating the retard amount includes calculating the retard amount according to the rotational speed of the engine and the detected transmission gear ratio.

More preferably, the ignition timing control method further comprises at least one of the steps of detecting an opening degree of a throttle valve, and detecting an operating state of an accessory driven by the engine, and the step of calculating the retard amount includes calculating the retard amount further according to at least one of the opening degree of the throttle valve and the operating state of the accessory.

Further preferably, the step of calculating the retard amount includes calculating the retard amount such that a value of the retard amount for an initial stage of execution of the acceleration-dependent retardation is made different from values of the retard amount for stages of the execution of the acceleration-dependent retardation other than the initial stage.

According to these preferred embodiments, the same advantageous effects as provided by the corresponding embodiments of the ignition timing control system according to the first aspect of the invention, respectively, can be obtained.

To attain the above object, according to a fourth aspect of the invention, there is provided an engine control unit for an internal combustion engine, including a control program for causing a computer to perform ignition timing control of the engine to retard ignition timing thereof, during acceleration, wherein the control program causes the computer to detect a demand of acceleration of the engine, detect a rotational speed of the engine, calculate a variation amount of the rotational speed of the engine, based on the detected rotational speed of the engine, calculate a differential value of the variation amount of the rotational speed of the engine, based on the calculated variation amount of the rotational speed of the engine, calculate a retard amount for retarding the ignition timing, and execute retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

This engine control unit according to the fourth aspect of the invention provides the same advantageous effects as provided by ignition timing control system according to the first aspect of the invention.

Preferably, the program causes the computer to stop retardation of the ignition timing by the retard amount, on condition that the variation amount of the rotational speed of the engine is smaller than the predetermined amount, and that the differential value of the variation amount of the rotational speed of the engine is larger than the predetermined value.

Preferably, the program causes the computer to detect a transmission gear ratio of a transmission connected to the engine, and when the program causes the computer to calculate the retard amount, the program causes the computer to calculate the retard amount according to the rotational speed of the engine and the detected transmission gear ratio.

More preferably, the program causes the computer to detect at least one of an opening degree of a throttle valve and an operating state of an accessory driven by the engine, and when the program causes the computer to calculate the retard amount, the program causes the computer to calculate the retard amount further according to at least one of the opening degree of the throttle valve and the operating state of the accessory.

Further preferably, when the program causes the computer to calculate the retard amount, the program causes the computer to calculate the retard amount such that a value of the retard amount for an initial stage of execution of the acceleration-dependent retardation is made different from values of the retard amount for stages of the execution of the acceleration-dependent retardation other than the initial stage.

According to these preferred embodiments, the same advantageous effects as provided by the corresponding embodiments of the ignition timing control system according to the first aspect of the invention, respectively, can be obtained.

The above and other objects, features, and advantages of the invention will become more apparent from the following detailed description taken in conjunction with the accompanying drawings.

DETAILED DESCRIPTION OF PREFERRED EMBODIMENT

Figure 1:
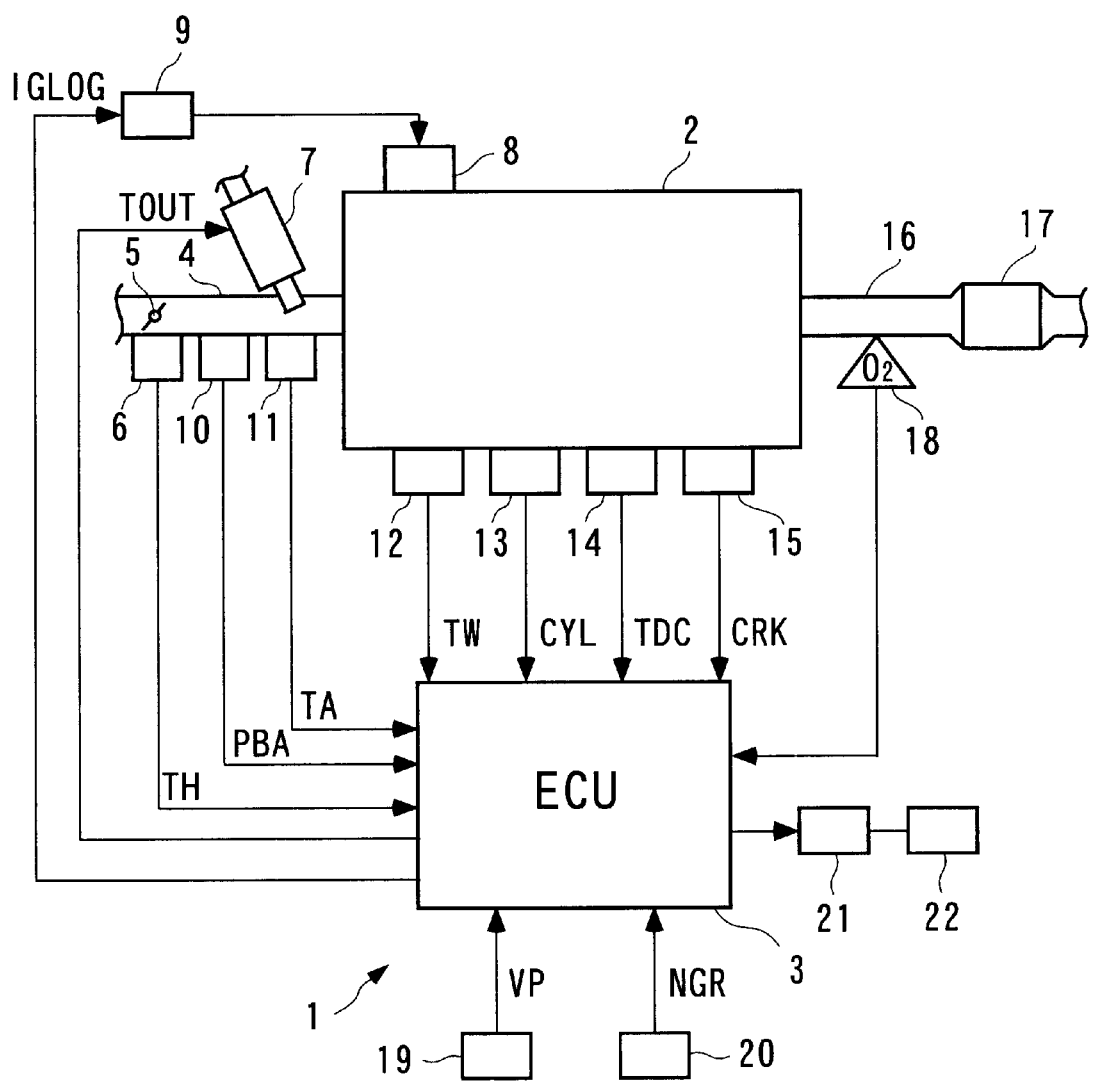
FIG. 1 is a block diagram schematically showing the arrangement of an ignition timing control system according to an embodiment of the invention and an internal combustion engine to which the system is applied.

The invention will now be described in detail with reference to the drawings showing a preferred embodiment thereof. FIG. 1 shows the arrangement of a ignition timing control system 1 according to the preferred embodiment and an internal combustion engine 2 to which the ignition timing control system 1 is applied.

This internal combustion engine (hereinafter referred to as "the engine") 2 is a four-cylinder four-cycle engine installed on a vehicle, not shown. Further, the vehicle is an MT vehicle having a manual transmission (transmission) installed thereon. The engine 2 has an intake pipe 4 having a throttle valve 5 arranged therein. The opening degree (hereinafter referred to as "throttle opening") TH of the throttle valve 5 is detected by a throttle opening sensor 6 (acceleration demand-detecting means, throttle opening-detecting means), and a signal indicative of the detected throttle opening TH is delivered to an ECU 3, referred to hereinafter.

The intake pipe 4 has fuel injection valves (hereinafter referred to as "injectors", only one of which is shown) 7 inserted therein for respective cylinders, at a location downstream of the throttle valve 5 and immediately upstream of intake valves (not shown). Each injector 7 is connected to a fuel pump, not shown, and is electrically connected to the ECU 3 to have a valve opening period (fuel injection period) TOUT controlled by a drive signal from the ECU 3.

Further, the cylinders of the engine 2 have respective ignition plugs 8 (only one of which is shown) inserted therein which are connected to the ECU 3 via respective distributors 9. Each ignition plug 8 performs discharge by application of a high voltage thereto and following interruption of the same, whereby a mixture in the corresponding cylinder is ignited.

On the other hand, an intake pipe absolute pressure sensor 10 is inserted into the intake pipe 4 at a location downstream of the throttle valve 5. The intake pipe absolute pressure sensor 10 is comprised of a semiconductor pressure sensor, and detects an absolute pressure in the intake pipe 4 as the intake pipe absolute pressure sensor PBA to deliver a signal indicative of the detected intake pipe absolute pressure PBA to the ECU 3. The intake pipe 4 also has an intake air temperature sensor 11 inserted therein at a location downstream of the intake pipe absolute pressure sensor 10. The intake air temperature sensor 11 is comprised of a thermistor or the like, and detects an intake air temperature TA of intake air within the intake pipe 4 to deliver a signal indicative of the detected intake air temperature TA to the ECU 3. Further, an engine coolant temperature sensor 12 formed of a thermistor or the like is mounted in the cylinder block of the engine 2. The engine coolant temperature sensor 12 detects an engine coolant temperature TW which is a temperature of an engine coolant circulating through the cylinder block of the engine 2 to deliver a signal indicative of the detected engine coolant temperature to the ECU 3.

On the other hand, around a crankshaft, not shown, of the engine 2, there are arranged a cylinder discriminating sensor 13, a TDC sensor 14, and a crank angle sensor 15 (rotational speed-detecting means), all of which are connected to the ECU 3. These sensors 13 to 15 are each comprised of a magnet rotor and an MRE (magnetoresistance element) pickup, and generate pulse signals at predetermined crank angle positions, respectively. More specifically, the cylinder discriminating sensor 13 generates a cylinder discriminating signal (hereinafter referred to as "the CYL signal") at a predetermined crank angle position of a particular cylinder. The TDC sensor 14 generates a TDC signal at a predetermined crank angle position of each cylinder slightly before a TDC (top dead center) position at the start of an intake stroke of the piston in the cylinder. In the case of the four-cylinder engine of the present embodiment, the TDC sensor 14 delivers one pulse whenever the crankshaft rotates through 180 degrees. Further, the crank angle position sensor 15 generates a crank angle position signal (hereinafter referred to as the "CRK signal") at a shorter repetition period than a repetition period of the TDC signal i.e. whenever the crankshaft rotates through e.g. 30 degrees.

The ECU 3 determines the crank angle position of each cylinder based on these CYL, TDC, and CRK signals, and calculates a rotational speed (hereinafter referred to as "the engine rotational speed") NE based on the CRK signal.

The engine 2 has an exhaust pipe 16 having a three-way catalyst 17 arranged therein for reducing emissions of exhaust gases, such as HC, CO, and NOx. Further, an oxygen concentration sensor 18 is arranged in the exhaust pipe 16 at a location upstream of the three-way catalyst 17, for detecting concentration of oxygen present in exhaust gases to deliver a signal indicative of the detected oxygen concentration to the ECU 3.

Also input to the ECU 3 are a signal indicative of a travelling speed of the vehicle (vehicle speed) VP from a vehicle speed sensor 19, and a signal indicative of a gear position number NGR corresponding to a gear position of the manual transmission from a gear position sensor 20 (transmission gear ratio-detecting means). The gear position number NGR has values 1 to 6 assigned thereto in a manner corresponding to respective gear positions of a first to a sixth speed. Further, also connected to the ECU 3 is an electromagnetic air conditioner clutch 21 for connecting and disconnecting a compressor (not shown) of an air conditioning unit (hereinafter referred to as "the air conditioner") 22 (accessory) to and from the engine 2, and the air conditioner clutch 21 is engaged and disengaged by a drive signal from the ECU 3.

The ECU 3 comprises, in the present embodiment, acceleration demand-detecting means, rotational speed-detecting means, rotational variation amount-calculating means, rotational variation amount differential value-calculating means, retard amount-calculating means, retardation execution means, retardation-stopping means, accessory operating state-detecting means, and initial retardation-calculating means. The ECU 3 is comprised of a micro-computer including a CPU, a RAM, a ROM, and an input/output interface, none of which are shown.

The CPU determines operating conditions of the engine based on the signals indicative of parameters of operation of the engine detected by the above-mentioned sensors, and calculates the fuel injection period TOUT and the ignition timing IGLOG according to the determination in synchronism with generation of each TDC signal pulse to deliver drive signals based on the results of the calculations to the injectors 7 and the distributors 9. Further, when the vehicle is accelerated, the acceleration-dependent retard control of the ignition timing IGLOG is carried out as described in detail hereafter.

Figure 2:
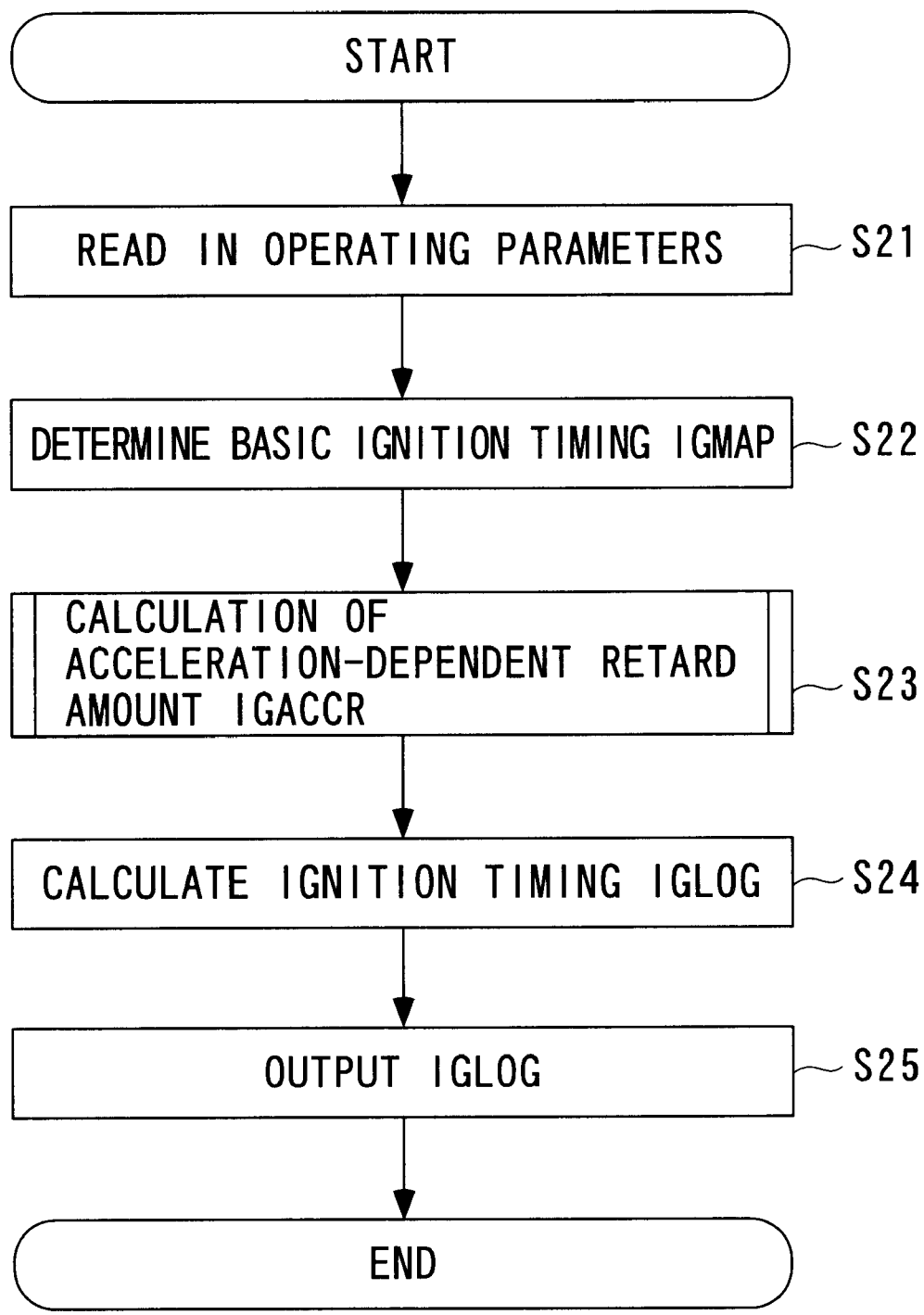
FIG. 2 is a flowchart showing a main routine for carrying out a process for calculating ignition timing, which is executed by the FIG. 1 ignition timing control system.

FIG. 2 shows a main routine for a process for calculating ignition timing IGLOG, which is executed in synchronism with generation of each TDC pulse. First, in a step S21, operating parameters detected by the above-mentioned sensors are read in. Then, by searching a map, not shown, according to the engine rotational speed NE and the intake pipe absolute pressure PBA, a basic ignition timing IGMAP is determined in a step S22.

Then, an acceleration-dependent retard amount IGACCR is calculated in a step S23. The acceleration-dependent retard amount IGACCR is calculated in the acceleration-dependent retard control executed when the vehicle is accelerated, details of which will be described hereinafter.

Then, the ignition timing IGLOG is calculated in a step S24 by substituting the calculated acceleration-dependent retard amount IGACCR into the following equation (1):

$$IGLOG=IGMAP-IGACCR+IGCRO \qquad (1)$$

wherein IGCRO represents a correction amount other than the acceleration-dependent retard amount IGACCR, which includes e.g. a water temperature-dependent advance amount determined according the engine coolant temperature TW, an intake air temperature-dependent advance amount determined according to the intake air temperature TA, and a warm-up acceleration advance amount for accelerating warm-up of the engine at a cold start thereof.

Then, the drive signal based on the calculated ignition timing IGLOG is delivered to each distributor 9 in a step S25, for control of ignition timing of each cylinder, followed by terminating the present program.

Figure 3:
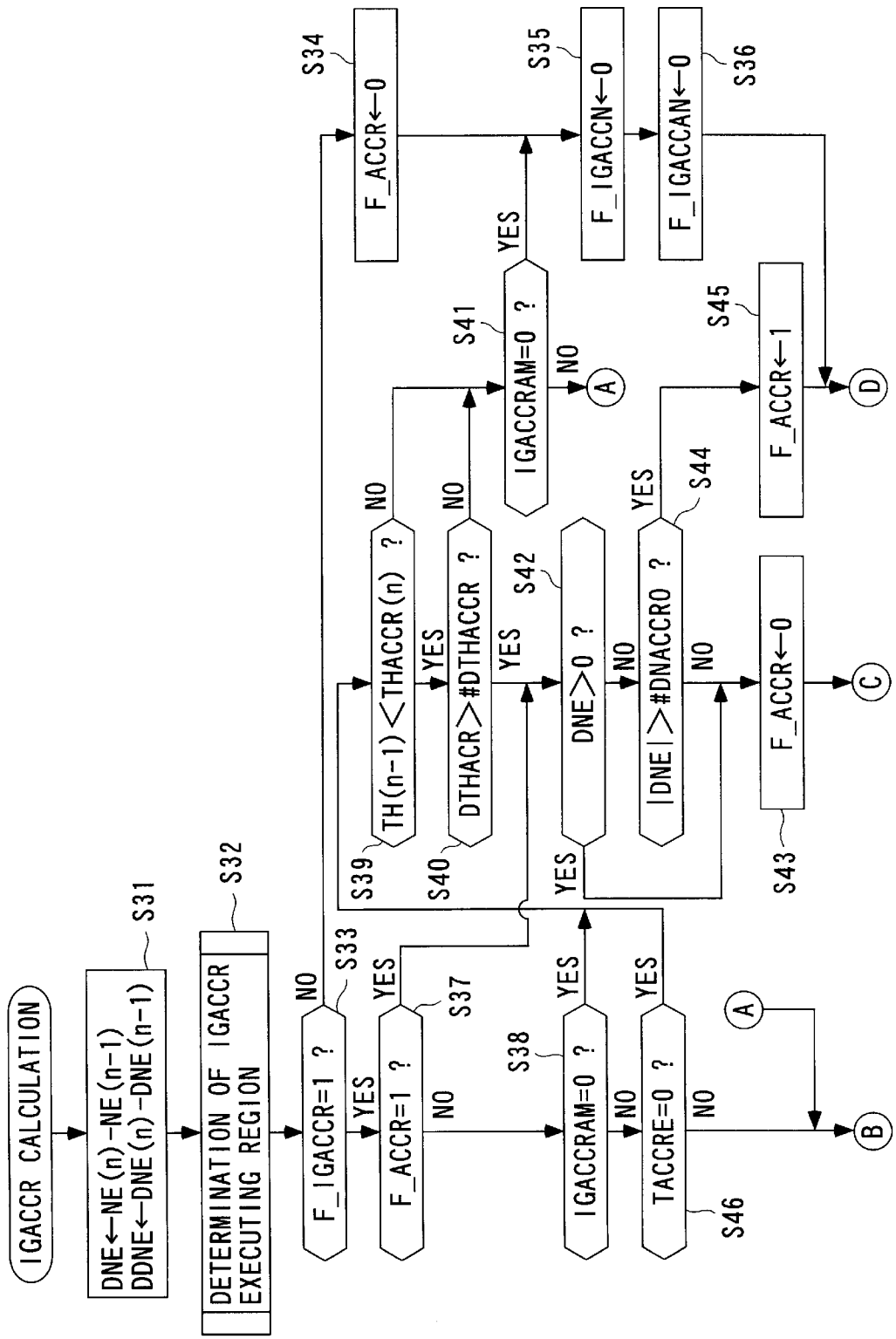
FIG. 3 is a flowchart showing a subroutine for a process for calculating an acceleration-dependent retard amount, which is executed in the FIG. 2 main routine.
Figure 4:
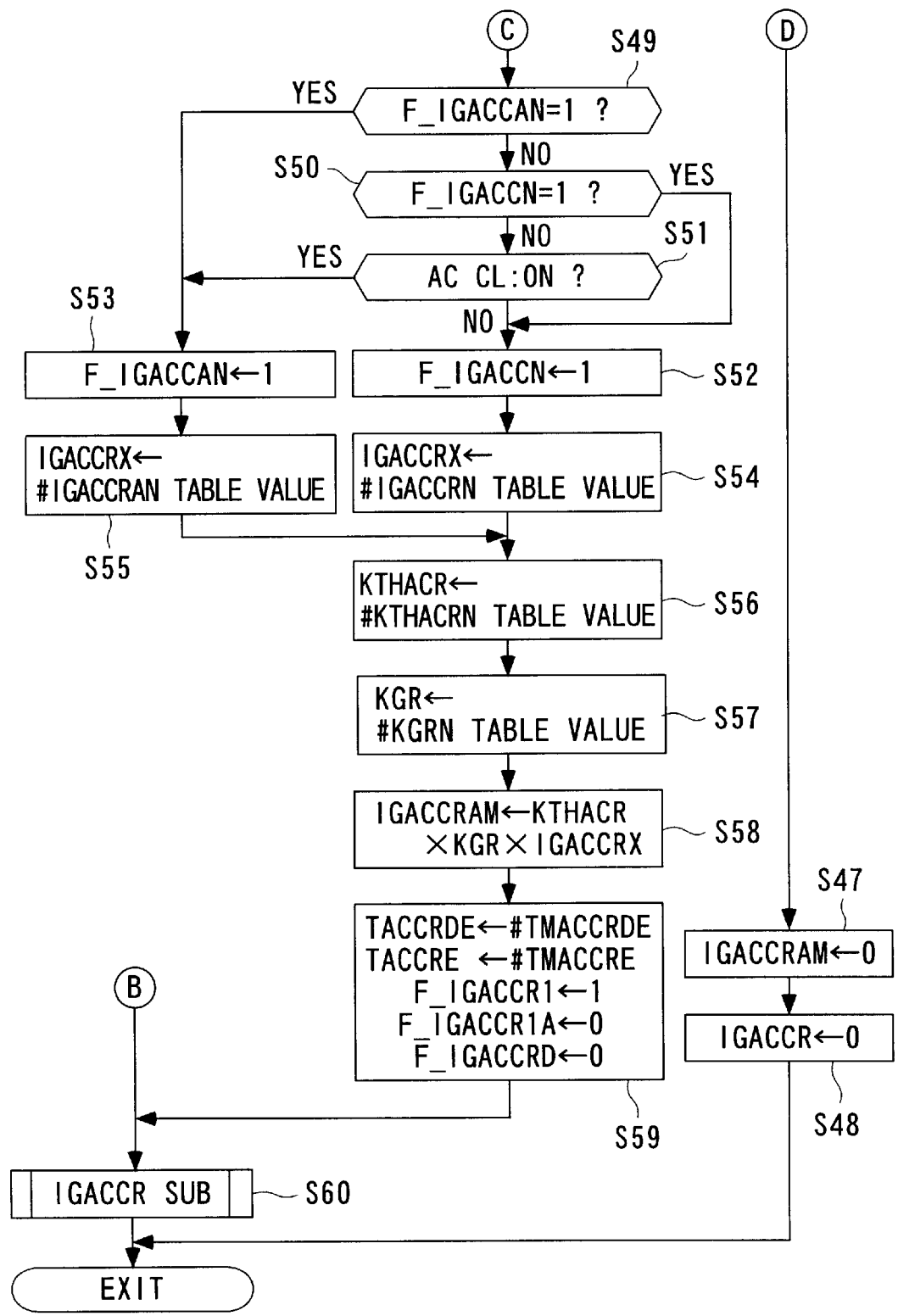
FIG. 4 is a flowchart showing a continuation of the FIG. 3 flowchart.

FIGS. 3 and 4 show a subroutine for the process for calculating the acceleration-dependent retard amount IGACCR which is executed in the step S23 in FIG. 2. It should be noted that in the following description, a symbol "#" is added to the head of each data item stored in the ROM of the ECU 3 for discrimination from other data detected and updated as required. In the present subroutine, first, in a step S31, the difference (NE(n)−NE(n−1)) between the present value NE(n) and the immediately preceding value NE(n−1) of the engine rotational speed NE is calculated as the rotational variation amount DNE (rotational variation amount), and the difference (DNE(n)−DNE(n−1)) between the present value DNE(n) and the immediately preceding value DNE(n−1) of the rotational variation amount is calculated as the rotational variation amount differential value DDNE (rotational variation amount differential value).

Then, the process proceeds to a step S32, wherein an executing region-determining process for the acceleration-dependent retard control is executed. The executing region-determining process determines whether the engine 2 is in an operating region suitable for the acceleration-dependent retard control, and executed by a subroutine shown in FIG. 8. In this subroutine, first, in a step S71, a table value #THACCRN is retrieved from a table an example of which is shown in FIG. 9, according to the engine rotational speed NE, and set to a throttle opening reference value THACCR. As shown in FIG. 9, the table is configured such that the table value #THACCR assumes progressively-increasing values corresponding to four grid points NE1 to NE4 indicative of progressively-increasing values of the engine rotational speed NE, respectively. Between the grid points, the table value #THACCR is calculated by interpolation.

The throttle opening reference value THACCR is set as above for the following reason: As described hereinafter, in the acceleration-dependent retard control of the present invention, the fact that the throttle valve 5 was in a small opening degree condition in the immediately proceeding loop is one of conditions for starting the acceleration-dependent retard control, and whether or not the throttle valve 5 is in this small opening degree condition is determined with reference to the throttle opening reference value THACCR. Further, the longitudinal vibrations of the vehicle caused by the acceleration-caused fluctuations in the engine rotational speed NE are more liable to occur as the engine rotational speed NE is higher, since the torque of the engine 2 is larger as the engine rotational speed NE is higher. Therefore, a throttle opening region within which the throttle valve 5 is determined to be in the small opening degree condition is widened as the engine rotational speed NE is higher, to thereby increase the frequency of the acceleration-dependent retard control as the engine rotational speed NE is higher.

Then, the difference (TH(n)−TH(n−1)) between the present value TH(n) and the immediately preceding value TH(n−1) of the throttle opening is calculated as the throttle opening variation amount DTHACR (step S72).

Next, it is determined in a step S73 whether or not the engine coolant temperature TW is higher than a lower limit value #TWIGACCR (e.g. 70° C.), in a step S74 whether or not the vehicle speed VP is between a lower limit value #VIGACCRL (e.g. 5 km/h) and a higher limit value #VIGACCRH (e.g. 180 km/h), and in a step S75 whether or not the engine rotational speed NE is between a lower limit value #NIGACCR (e.g. 1000 rpm) and a higher limit value #NIGACCRH (e.g. 7000 rpm).

If any of the answers to these questions is negative (NO), it is determined that the engine is not in an operating region suitable for execution of the acceleration-dependent retard control so that an acceleration-dependent retardation permitting flag F_IGACCR is set to 0 in a step S76, thereby inhibiting the acceleration-dependent retard control, followed by terminating the present subroutine. On the other hand, if all of these answers are affirmative (YES), i.e. if the engine coolant temperature TW, the vehicle speed VP, and the engine rotational speed NE are in respective predetermined ranges, the engine 2 is determined to be in the operating region suitable for execution of the acceleration-dependent retard control so that the acceleration-dependent retardation permitting flag F_IGACCR is set to 1 in a step S77, thereby permitting the acceleration-dependent retard control, followed by terminating the present subroutine.

Referring again to FIG. 3, in steps S33 to S46 following the step S32, it is determined whether or not the conditions for starting the acceleration-dependent retard control are satisfied. First, in the step S33, it is determined whether or not the acceleration-dependent retardation permitting flag F_IGACCR assumes 1. If the answer to this question is negative (NO), i.e. if the acceleration-dependent retard control has been inhibited by the FIG. 8 determining process, a rotational speed decrease flag F_ACCR, an air conditioner stoppage flag F_IGACCN, and an air conditioner operation flag F_IGACCAN, referred to hereinbelow, are all set to 0 in steps S34 to S36, respectively, and further in steps S47 and S48 in FIG. 4, an acceleration-dependent retard calculation amount IGACCRAM, referred to hereinafter, and the acceleration-dependent retard amount IGACCR are both set to 0, followed by terminating the present program.

On the other hand, if the answer to the question of the step S33 is affirmative (YES), i.e. if the acceleration-dependent retard control is permitted, it is determined in a step S37 whether or not the rotational speed decrease flag F_ACCR assumes 1. Through the execution of the step S34, immediately after the acceleration-dependent retard control is permitted, the answer to this question is negative (NO), and hence in this case, the program proceeds a step S38, wherein it is determined whether or not the acceleration-dependent retard calculation amount IGACCRAM assumes 0. Through the execution of the step S47, immediately after the acceleration-dependent retard control is permitted, the answer to this question is affirmative (YES), and hence in this case, the program proceeds a step S39 et seq.

Figure 8:
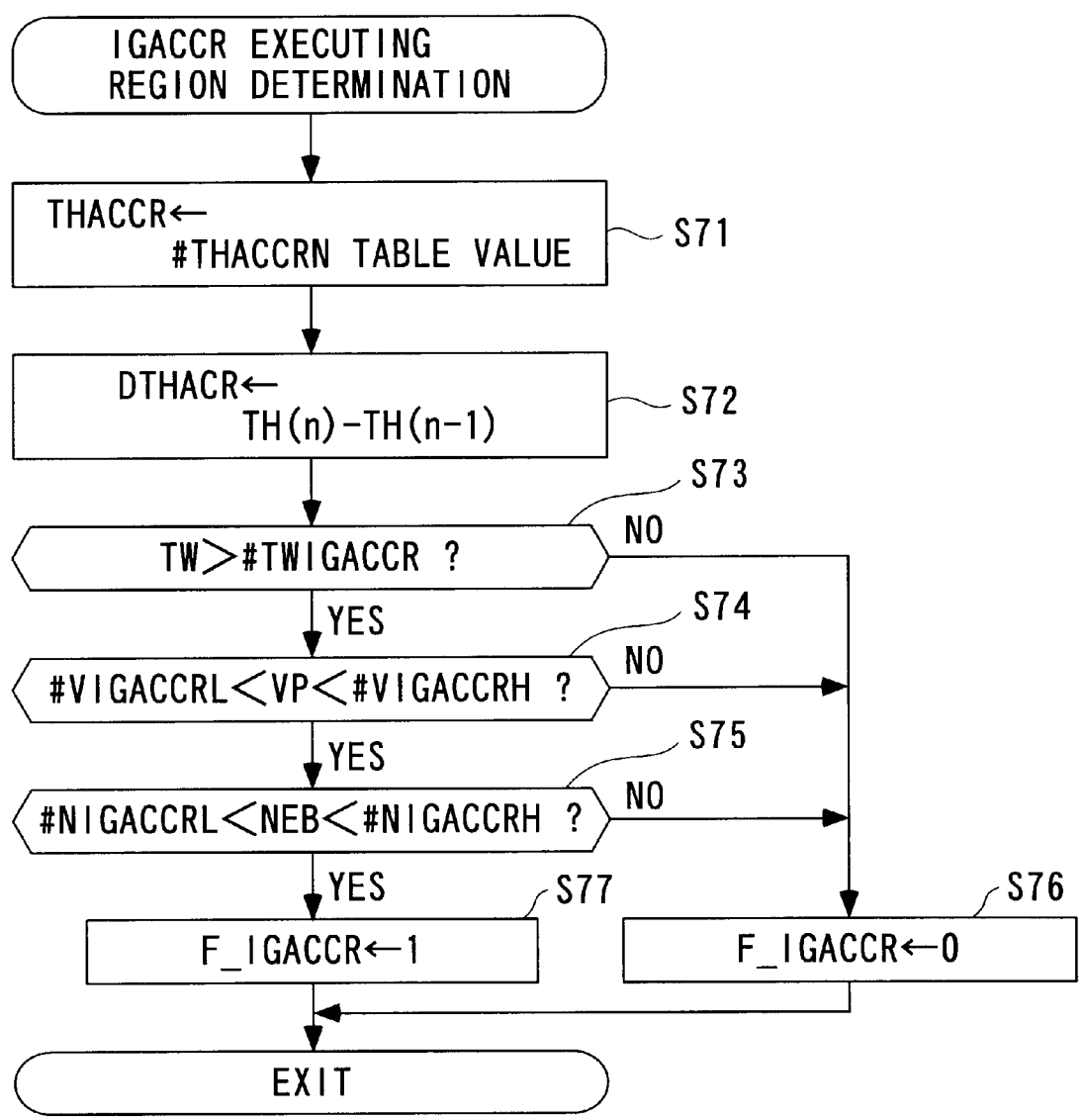
FIG. 8 is a flowchart of a subroutine for an executing region-determining process for the acceleration-dependent retard control, which is executed in a step S32 in FIG. 3.
Figure 9:
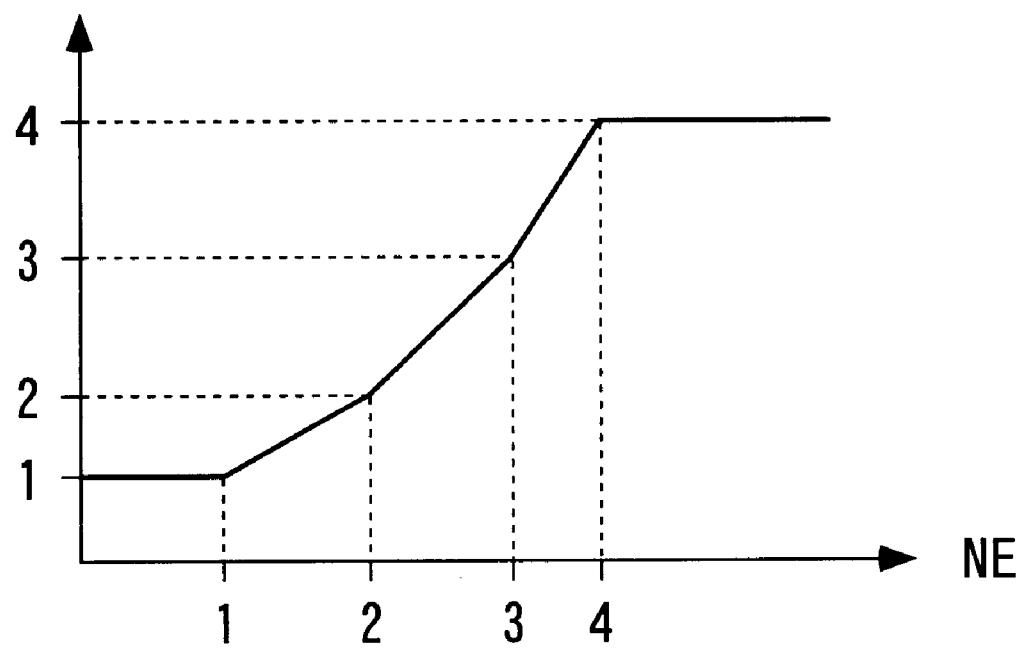
FIG. 9 shows an example of a #THACCRN table for setting a throttle opening reference value THACCR.

In the step S39, it is determined whether or not the immediately preceding value TH(n−1) of the throttle opening is smaller than the present value THACCR(n) of the throttle opening reference value set in the step S71 in FIG. 8, and in a step S40, it is determined whether or not the throttle opening variation amount DTHACR calculated in the step S72 in FIG. 8 is larger than a predetermined reference value #DTHACCR (e.g. 10 degrees). If any of the answers to these questions is negative (NO), i.e. if the throttle valve 5 has not been suddenly opened from its small opening degree condition, it is judged that the demand of acceleration is not so high and hence the conditions for starting the acceleration-dependent retard control are not satisfied, so that it is determined in a step S41 whether or not the acceleration-dependent retard calculation amount IGACCRAM is equal to 0. If the answer to this question is affirmative (YES), i.e. if the acceleration-dependent retard control is not being executed, the program proceeds to the step S35, et seq., to withhold starting the acceleration-dependent retard control, whereas if the answer is negative (NO), i.e. if the acceleration-dependent retard control is being executed, the program proceeds to a step S60, referred to hereinafter, wherein a process for calculating the acceleration-dependent retard amount IGACCR is carried out.

On the other hand, if both the answers to the questions of the steps S39 and S40 are affirmative (YES), it is determined in a step S42 whether or not the rotational variation amount DNE calculated in the step S31 is larger than a value of 0. If the answer to this question is affirmative (YES), i.e. if the throttle valve 5 has been suddenly opened from the small opening degree condition and hence the demand of acceleration is high, and at the same time, the engine rotational speed NE has increased between the immediately preceding loop and the present loop, the rotational speed decrease flag F_ACCR is set to 0 in a step S43, and at the same time, judging that the conditions for starting the acceleration-dependent retard control are satisfied, the program proceeds to the step S49 et seq. in FIG. 4 to calculate the acceleration-dependent retard calculation amount IGACCRAM.

If the answer to the question of the step S42 is negative (NO), and hence the engine rotational speed NE has not increased, it is determined in a step S44 whether or not the absolute value |DNE| of the rotational variation amount is larger than a reference value #DNACCRO (e.g. 10 rpm). If the answer to this question is negative (NO), i.e. even when the engine rotational speed HE has decreased, if the amount of the variation is small, the step 43 is executed, and at the same time, judging that the conditions for starting the acceleration-dependent retard control are satisfied, the program proceeds to the step S49 et seq.

If the answer to the question of the step S44 is affirmative (YES), i.e. if the engine rotational speed NE has decreased, and at the same time, the amount of the decrease is large, the rotational speed decrease flag F_ACCR is set to 1 in a step S45, and at the same time, judging that the conditions for starting the acceleration-dependent retard control are not satisfied, the steps S47 and S48 in FIG. 4 are executed to set both the acceleration-dependent retard calculation amount IGACCRAM and the acceleration-dependent retard amount to 0. Once the rotational speed decrease flag F_ACCR has been set to 1, as described above, the answer to the question of the step S37 becomes affirmative (YES), and in this case, the program proceeds to the step S42, et seq. That is, in the case of the throttle valve 5 being suddenly opened, if the engine rotational speed NE has decreased and the amount of the decrease is large, the start of the acceleration-dependent retard control is withheld, and subsequently, after waiting for the engine rotational speed NE to increase, the acceleration-dependent retard control is started.

Further, if the answer to the question of the step S38 is negative (NO), i.e. if the acceleration-dependent retard control is being executed, it is determined in a step S46 whether or not the count of a retardation termination downcount timer TACCRE, referred to hereinafter, is equal to 0. If the answer to this question is affirmative (YES), the program proceeds to the step S39 et seq., whereas if the same is negative (NO), the program proceeds to the step S60.

If it is determined in the step S42 or S44 that the conditions for starting the acceleration-dependent retard control are satisfied, in steps S49 to S59 in FIG. 4 following the step S43, the acceleration-dependent retard calculation amount IGACCRAM is set.

First, in the step S49 and S50, it is determined whether or not the air conditioner operation flag F_IGACCAN assumes 1, and whether or not the air conditioner stoppage flag F_IGACCN assumes 1, respectively. If both of the answers to these questions are negative (NO), it is determined in a step S51 whether or not the air conditioner clutch 21 (AC CL) is engaged (ON). If the answer to this question is negative (NO), the air conditioner stoppage flag F_IGACCN is set to 1 in a step S52, whereas if the answer is affirmative (YES), the air conditioner operation flag F_IGACCAN is set to 1 in a step S53. Further, if the answer to the question of the step S50 is affirmative (YES), i.e. if the air conditioner stoppage flag F_IGACCN has already been set to 1, the program proceeds to the step S52 to hold the value, and similarly, if the answer to the question of the step S49 is affirmative (YES), i.e. if the air conditioner operation flag F_IGACCAN has been already set to 1, the program proceeds to the step S53 to hold the value. Thus, once the air conditioner stoppage flag F_IGACCN and the air conditioner operation flag F_IGACCAN have been set independence on the engaged or disengaged state of the air conditioner clutch 21, their values are held thereafter.

Figure 5A:
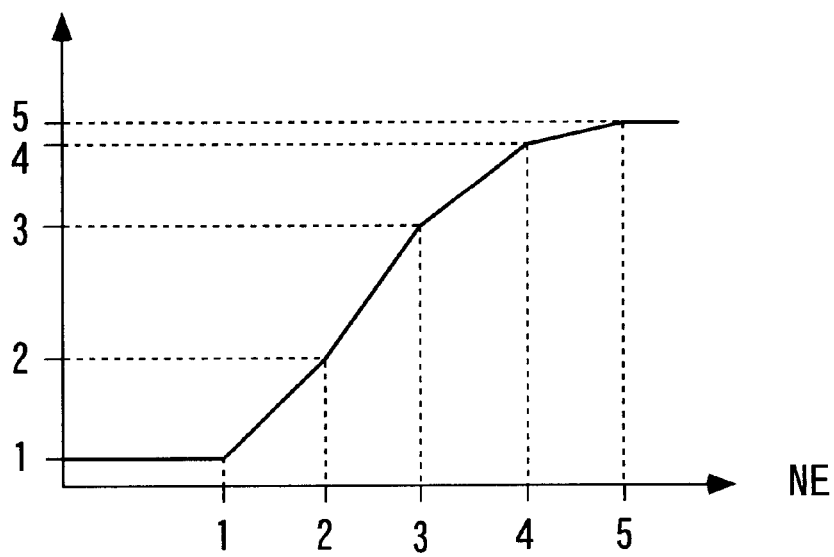
FIG. 5A shows an example of a #IGACCRN table for setting an acceleration-dependent retard amount basic value IGACCRX during stoppage of an automotive air-conditioner.

If the air conditioner 22 is in stoppage, in a step S54 following the step S52, a table value #IGACCRN for the air conditioner stoppage condition is retrieved from a table an example of which is shown in FIG. 5A according to the engine rotational speed NE, and set to an acceleration-dependent retard amount basic value IGACCRX. As shown in FIG. 5A, the table is configured such that the table value #IGACCRN assumes progressively-increasing values corresponding to five grid points NE1 to NE5 indicative of progressively-increasing values of the engine rotational speed NE, respectively. Between the grid points, the table value #IGACCRN is calculated by interpolation. This is because as the engine rotational speed NE is higher, the torque of the engine 2 is larger, which makes the longitudinal vibrations of the vehicle more liable to occur, as described hereinabove, so that the acceleration-dependent retard amount basic value IGACCRX is set to a larger value to thereby increase the amount of reduction of torque of the engine 2.

Figure 5B:
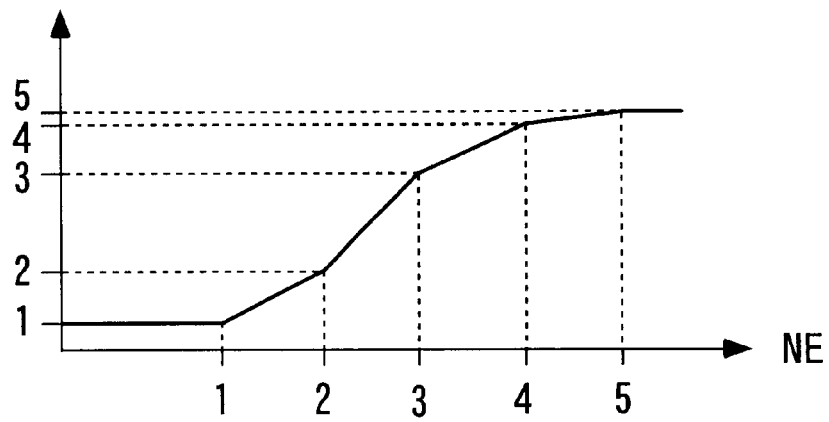
FIG. 5B shows an example of a #IGACCRAN table for setting the acceleration-dependent retard amount basic value IGACCRX during operation of the automotive air-conditioner.

On the other hand, if the air conditioner 22 is in operation, in a step S55 following the step S53, a table value #IGACCRAN for the air conditioner operating condition is retrieved from a table an example of which is shown in FIG. 5B according to the engine rotational speed NE, and set to the acceleration-dependent retard amount basic value IGACCRX. As shown in FIG. 5B, similarly to the table of the table value #IGACCRN for the air conditioner stoppage condition, the table is configured such that the table value #IGACCRAN assumes progressively-increasing values corresponding to five grid points NE1 to NE5 indicative of progressively-increasing values of the engine rotational speed NE, respectively, which are smaller than corresponding values of the table value #IGACCRN. This is to secure torque of the engine 2 in a manner adapted to the increase in the load on the engine 2 caused by operation of the air conditioner 22.

Figures 6, 7:
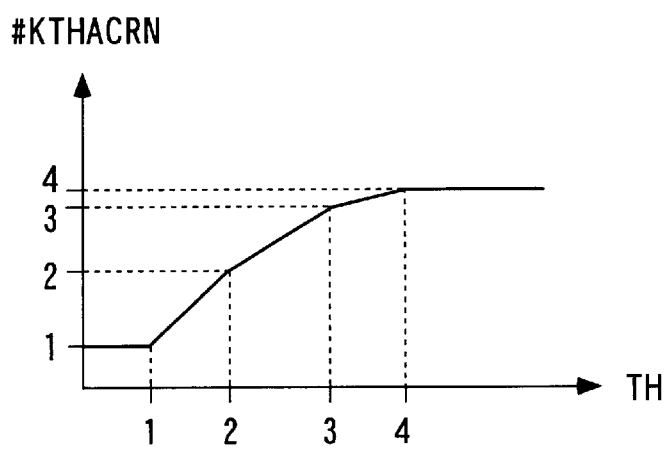
FIG. 6 shows an example of a #KTHACRN table for setting a throttle opening-dependent correction coefficient KTHACR.
FIG. 7 shows an example of a #KGRN table for setting a gear position-dependent correction coefficient KGR.

Next, in a step S56 following the step S54 or S56, a table value #KTHACRN is retrieved from a table an example of which is shown in FIG. 6 according to the throttle opening TH, and set to a throttle opening-dependent correction coefficient KTHACR. As shown in FIG. 6, the table is configured such that the table value #KTHACRN assumes progressively-increasing values corresponding to four grid points TH1 to TH4 indicative of progressively-increasing values of the throttle opening TH, respectively. Between the grid points, the table value #KTHACRN is calculated by interpolation. This is because as the throttle opening TH is larger, the torque of the engine 2 is larger, which makes the longitudinal vibrations of the vehicle more liable to occur, so that the throttle opening-dependent correction coefficient KTHACR is set to a larger value to thereby increase the amount of reduction of torque of the engine 2.

Next, the program proceeds to a step S57, wherein a table value #KGRN is retrieved from a table an example of which is shown in FIG. 7 according to the gear position number NGR, and set to a gear position-dependent correction coefficient KGR. As shown in FIG. 7, the table is configured such that the table value #KGRN assumes a larger value as the gear position number NGR is smaller, i.e. as the gear ratio is smaller. This is because as the gear ratio is smaller, the reaction from the driving wheels is larger during acceleration of the vehicle, which makes the longitudinal vibrations of the vehicle more liable to occur, so that the gear position-dependent correction coefficient KGR is set to a larger value to thereby increase the amount of reduction of torque of the engine 2.

Then, the program proceeds to a step S58, wherein a value obtained by multiplying the acceleration-dependent retard amount basic value IGACCRX set in the step S54 or S55 by the throttle opening-dependent correction coefficient KTHACR and the gear position-dependent correction coefficient KGR set in the respective steps S56 and S57 is set to the acceleration-dependent retard calculation amount IGACCRAM.

Next, in a step S59, an F_IGACCRD inversion timer TACCDRE of a downcount type for determining whether or not inversion of an acceleration-dependent retardation execution flag F_IGACCRD, referred to hereinafter, has occurred, and an acceleration-dependent retardation termination timer TACCRE are set to respective predetermined time periods #TMACCRDE (e.g. 200 milliseconds) and #TMACCRE (e.g. 1500 milliseconds), and started, and further, a first-time acceleration-dependent retardation designation flag F_IGACCR1 is set to 1, and a first-time acceleration-dependent retardation execution flag F_IGACCR1A and the acceleration-dependent retardation execution flag F_IGACCRD are both set to 0.

Figure 11:
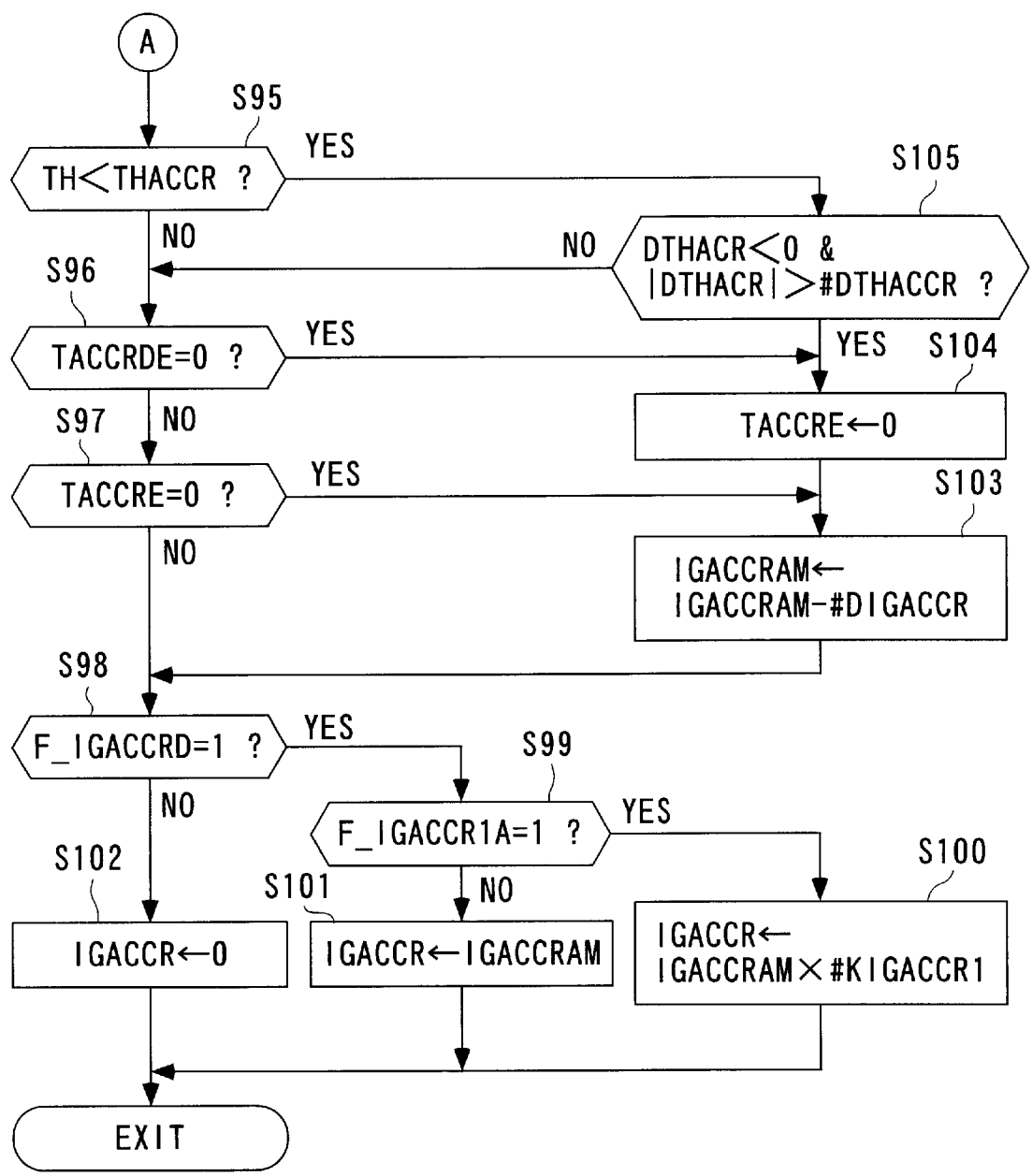
FIG. 11 is a continuation of the FIG. 10 flowchart.
Figure 12:
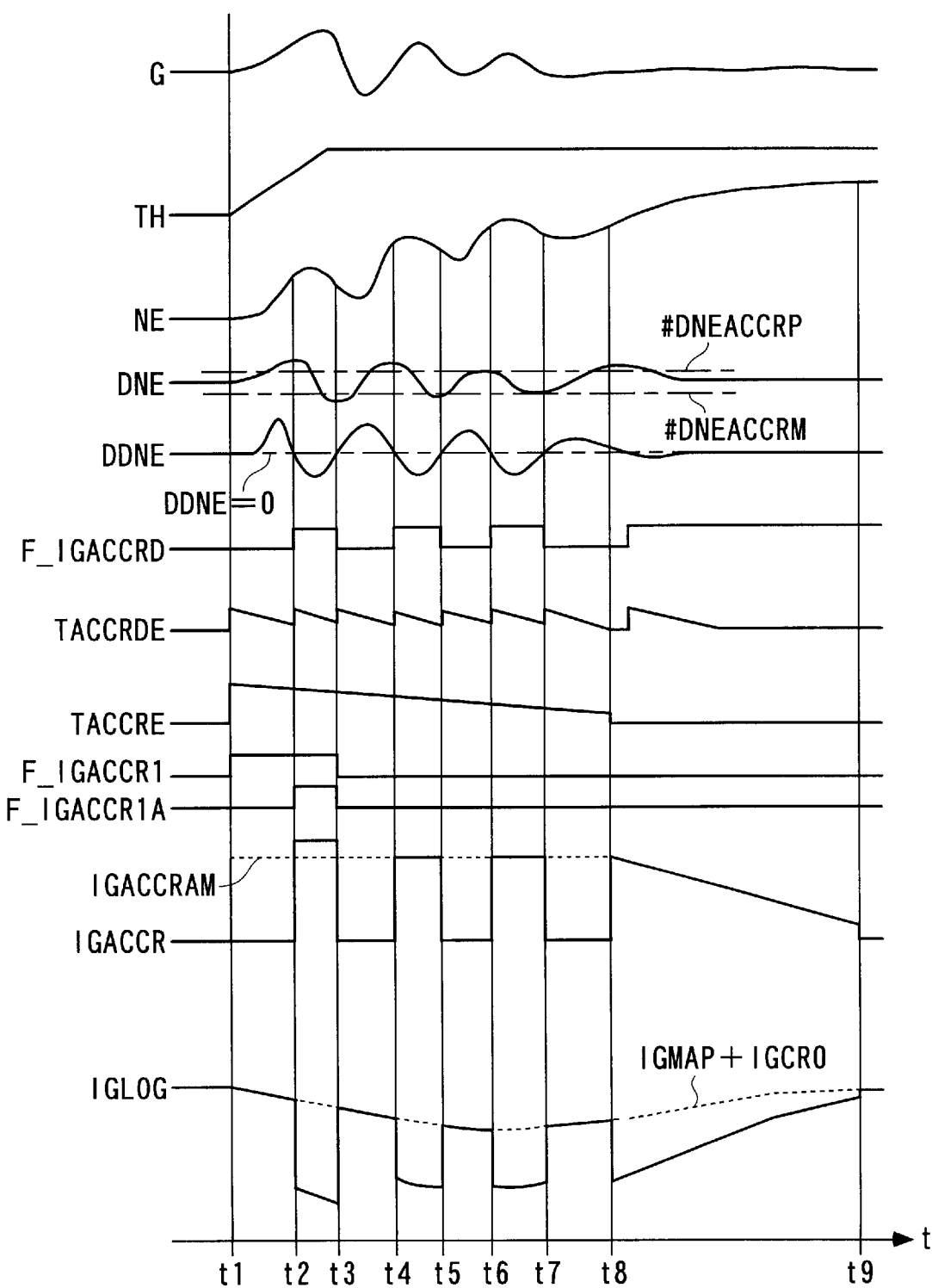
FIG. 12 is a timing chart showing an example of operations of the ignition timing control system during the acceleration-dependent retard control.

Then, the program proceeds to the step S60, wherein the process for calculating the acceleration-dependent retard amount IGACCR is carried out. FIGS. 11 and 12 show a subroutine for this process. First, in a step S81, it is determined whether or not the rotational variation amount DNE is larger than 0. If the answer to this question is affirmative (YES), i.e. if DNE>0 holds, i.e. if the engine rotational speed NE has increased between the immediately preceding loop and the present loop, it is determined in a step S82 whether or not the absolute value |DNE| of the rotational variation amount is equal to or larger than a predetermined reference value #DNEACCRP (e.g. 10 rpm) for the increase of the engine rotational speed NE. If the answer to this question is negative (NO), i.e. if |DNE|<#DNEACCRP holds, the program proceeds to a step S95 et seq. referred to hereinafter. This determination is carried out to exclude noise components contained in the rotational variation amount DNE caused by variation in combustion of the engine 2 to thereby prevent the noise components from causing erroneous operation of the acceleration-dependent retard control.

If the answer to the question of the step S82 is affirmative (YES), i.e. if |DNE|≧#DNEACCRP holds, it is determined in a step S83 whether or not the rotational variation amount differential value DDNE is equal to or larger than 0. If the answer to this question is affirmative (YES), i.e. if the rotational variation amount DNE has not decreased, it is judged that the conditions for executing the acceleration-dependent retardation are not satisfied, so that the program proceeds to the step S95, whereas if this answer is negative (NO), i.e. if DDNE<0 holds, that is, if the rotational speed NE has increased and at the same time, the rotational variation amount DNE has decreased between the immediately preceding loop and the present loop, it is judged that the vehicle-driving force is increasing and the conditions for executing the acceleration-dependent retardation are satisfied, and it is determined in a step S84 whether or not the acceleration-dependent retardation execution flag F_IGACCRD assumes 1. If the answer to this question is negative (NO), the acceleration-dependent retardation execution flag F_IGACCRD is set to 1 in a step S85, whereas if this answer is affirmative (YES), i.e. if the acceleration-dependent retardation is already being executed, the program proceeds to the step S95.

After the step S85, it is determined in a step S86 whether or not the first-time acceleration-dependent retardation designation flag F_IGACCR1 assumes 1. Through the execution of the step S59 in FIG. 4, immediately after the acceleration-dependent retard control is started, the answer to this question is affirmative (YES), so that in this case, the program proceeds to a step S87, wherein the first-time acceleration-dependent retardation execution flag F_IGACCR1A is set to 1, and then in a step S88, the F_IGACCRD inversion timer TACCRDE is set to the predetermined time period #TMACCRDE, and started. On the other hand, if the answer to the question of the step S86 is negative (NO), i.e. if F_IGACCR1=0 holds, i.e. if it is not immediately after the start of the acceleration-dependent retard control, the program skips the step S87 to proceed to the step S88.

On the other hand, if the answer to the question of the step S81 is negative (NO), i.e. if DNE≦0 holds, that is, if the engine rotational speed NE has decreased or has not changed, it is determined in a step S89 whether or not the absolute value |DNE| of the engine rotational amount is equal to or larger than the predetermined reference value #DNEACCRM (e.g. 5 rpm) for the decrease of the engine rotational speed NE. If the answer to this question is negative (NO), i.e. if |DNE|<#DNEACCRM holds, the program proceeds to the step S95, whereas if the answer is affirmative (YES), i.e. if |DNE|≧#DNEACCRM holds, it is determined in a step S90 whether or not the rotational variation amount differential value DDNE is equal to or larger than 0. If the answer to this question is negative (NO), i.e. if the rotational variation amount DNE has decreased, the program proceeds to the step S95.

On the other hand, if the answer to the question of the step S90 is affirmative (YES), i.e. if the engine rotational speed NE has decreased, and at the same time, the rotational variation amount DNE has not decreased, it is judged that the vehicle-driving force is not increasing, and hence conditions for stopping the acceleration-dependent retardation are satisfied, so that the program proceeds to a step S91, wherein it is determined whether or not the acceleration-dependent retardation execution flag F_IGACCRD assumes 1. If the answer to this question is affirmative (YES), i.e. if the acceleration-dependent retardation is being executed, the acceleration-dependent retardation execution flag F_IGACCRD is set to 0 in a step S92, whereas if the answer is negative (NO), i.e. if the acceleration-dependent retardation has already been stopped, the program proceeds to the step S95.

Then, it is determined in a step S93 whether or not the first-time retardation flag F_IGACCR1A assumes 1. If the answer to this question is affirmative (YES), i.e. if the first-time acceleration-dependent retardation is being executed, the first-time acceleration-dependent retardation designation flag F_IGACCR1 and the first-time acceleration-dependent retardation execution flag F_IGACCR1A are both set to 0 in a step S94, and then the program proceeds to the step S88, wherein the F_IGACCRD inversion timer TACCRDE is started. Further, if the answer to the question of the step S93 is negative (NO), i.e. if the acceleration-dependent retardation is being executed for other times than the first time, the program skips the step S94 to proceed to the step S88.

As described above, between the immediately preceding loop and the present loop, if the engine rotational speed NE has increased (DNE>0, |DNE|≧#DNEACCRP), and at the same time, the rotational variation amount DNE has decreased (DDNE<0), it is judged that the vehicle-driving force is being increasing and hence the conditions for executing the acceleration-dependent retardation are satisfied, so that the acceleration-dependent retardation is executed. On the other hand, if the engine rotational speed NE has decreased (DNE<0, |DNE|≧#DNEACCRPM) and at the same time, the rotational variation amount DNE has not decreased (DDNE≧0), it is judged that the vehicle-driving force is not increasing and hence the conditions for stopping the acceleration-dependent retardation are satisfied, so that the acceleration-dependent retardation is stopped. Further, neither of the above two kinds of conditions are not satisfied, the preceding control state is maintained.

Then, in the step S95 in FIG. 11 following the step S88, it is determined whether or not the throttle opening TH is smaller than the throttle opening reference value THACCR set in the step S71 in FIG. 8. If the answer to this question is negative (NO), i.e. if the throttle opening TH is not in the small opening degree condition, it is determined whether or not the respective counts of the F_IGACCRD inversion timer TACCRDE and the acceleration-dependent retardation termination timer TACCRE are equal to 0 (steps S96, S97). If both the answers to these questions of the steps S96 and S97 are negative (NO), it is determined in a step S98 whether or not the acceleration-dependent retardation execution flag F_IGACCRD assumes 1.

If the answer to this step S98 is affirmative (YES), i.e. if the conditions for executing the acceleration-dependent retardation are satisfied, it is determined in a step S99 whether or not the first-time acceleration-dependent retardation execution flag F_IGACCR1A assumes 1. If the answer to this question is affirmative (YES), i.e. if it is the first time to execute the acceleration-dependent retardation after the start of the acceleration-dependent retard control, a value obtained by multiplying the acceleration-dependent retard calculation amount IGACCRAM set in the step S58 in FIG. 4 by a first-time correction coefficient #KIGACCR1 (e.g. 1.5) larger than 1.0 is set to the acceleration-dependent retard amount IGACCR (step 100), followed by terminating the present subroutine. On the other hand, if the answer to the question of the step S99 is negative (NO), i.e. if it is the second or later time to execute the acceleration-dependent retardation, the acceleration-dependent retard calculation amount IGACCRAM is set to the acceleration-dependent retard amount IGACCR without modification in a step S101, followed by terminating the present subroutine. On the other hand, if the answer to the question of the step S98 is negative (NO), i.e. if F_IGACCRD=0 holds, in other words, if the conditions for stopping the acceleration-dependent retardation are satisfied, the acceleration-dependent retard amount IGACCR is set to 0 in a step S102, followed by terminating the present subroutine.

As described above, in the present acceleration-dependent retard control, the execution of the acceleration-dependent retardation when the acceleration-dependent retardation execution flag F_IGACCRD assumes 1, i.e. when the engine rotational speed NE has increased and at the same time the rotational variation amount DNE has decreased, and the stoppage of the acceleration-dependent retardation when the acceleration-dependent retardation execution flag F_IGACCRD assumes 0, i.e. when the engine rotational speed NE has decreased and at the same time the rotational variation amount DNE has not decreased, are alternately executed though switching therebetween. Further, only when the acceleration-dependent retardation is executed for the first time, the first-time correction coefficient #KIGACCR1 is applied to the calculation, whereby the acceleration-dependent retard amount IGACCR is set to a larger value.

On the other hand, if the answer to the question of the step S97 is affirmative (YES), i.e. if the count of the acceleration-dependent retardation termination timer TACCRE is equal to 0, i.e. if the predetermined time period #TMACCRE has elapsed after the start of the acceleration-dependent retard control, the acceleration-dependent retard control shifts to a termination mode, in which a value obtained by subtracting an ignition timing-restoring amount #DIGACCR (e.g. 0.2 degrees) from the acceleration-dependent retard calculation amount IGACCRAM is set to an updated value of the acceleration-dependent retard calculation amount IGAC-CRAM in a step S103. Thus, after the count of the acceleration-dependent retardation termination timer TAC-CRE has been reduced to 0, the answer to the question of the step S46 in FIG. 3 becomes affirmative (YES), so that the program proceeds to the step S39 et seq. Therefore, so long as the throttle valve 5 is not suddenly operated to open, until the answer to the question of the step S41 becomes affirmative (YES), i.e. until the acceleration-dependent retard calculation amount IGACCRAM is reduced to 0, the step S103 is repeatedly carried out, whereby the acceleration-dependent retard amount IGACCR is progressively reduced to 0, whereupon the acceleration-dependent retard control is terminated.

Further, if the answer to the question of the step S96 is affirmative (YES), i.e. if the count of the F_IGACCRD inversion timer TACCRDE is equal to 0, in other words, if the acceleration-dependent retardation execution flag F_IGACCRD has not been inverted over the predetermined time period #TMACCRDE, it is judged that the longitudinal vibrations of the vehicle have been controlled to termination and hence the acceleration-dependent retard control should be terminated, so that the acceleration-dependent retardation termination timer TACCRE is set to 0 in a step S104, and then the program proceeds to the step S103. This shifts the acceleration-dependent retard control to the termination mode, whereby the acceleration-dependent retard amount IGACCR is progressively reduced, as described above.

Further, if the answer to the question of the step S95 is affirmative (YES), i.e. if TH<THACCR holds, it is determined in a step S105 whether or not the throttle opening variation amount DTHACR is smaller than 0 and at the same time the absolute value |DTHACR| of the throttle opening variation amount DTHACR is larger than a predetermined reference value #DTHACCR. If the answer to this question is negative (NO), the program proceeds to the step S96, whereas if the answer is affirmative (YES), i.e. if the throttle valve 5 has been suddenly closed, the program proceeds to the step S104 wherein the acceleration-dependent retardation termination timer TACCRE is set to 0, whereby the acceleration-dependent retard control is forcedly shifted to the termination mode.

As described above, the acceleration-dependent retard control is terminated after shifting to the termination mode in which the acceleration-dependent retard amount IGACCR is progressively reduced, on condition that the predetermined time period #TMACCRE has elapsed after the start of the control, or that the acceleration-dependent retardation execution flag F_IGACCRD has not been inverted over the predetermined time period #TMACCRDE, or that the throttle valve 5 has been suddenly closed. Further, during execution of the termination mode, the answer to the question of the step S46 becomes affirmative (YES), and after execution of the termination mode, the answer to the question of the step S38 becomes affirmative (YES), so that in these cases the program proceeds to the step S39 et seq. Therefore, if the throttle valve 5 is suddenly opened in this state to satisfy the conditions for executing the acceleration-dependent retard control, the acceleration-dependent retard control is started again.

FIG. 12 shows an example of operations of the ignition timing control system performed during the acceleration-dependent retard control described heretofore. More specifically, if the throttle valve 5 is suddenly opened to cause an increase in the engine rotational speed NE at a time t1 (YES to step S42 in FIG. 3), the acceleration-dependent retard control is started, and the steps S49 to 59 in FIG. 4 are executed to calculate the acceleration-dependent retard calculation amount IGACCRAM, start the F_IGACCRD inversion timer TACCRDE and the acceleration-dependent retardation termination timer TACCRE, and set the first-time retardation designation flag F_IGACCR1 to 1.

Figure 10:
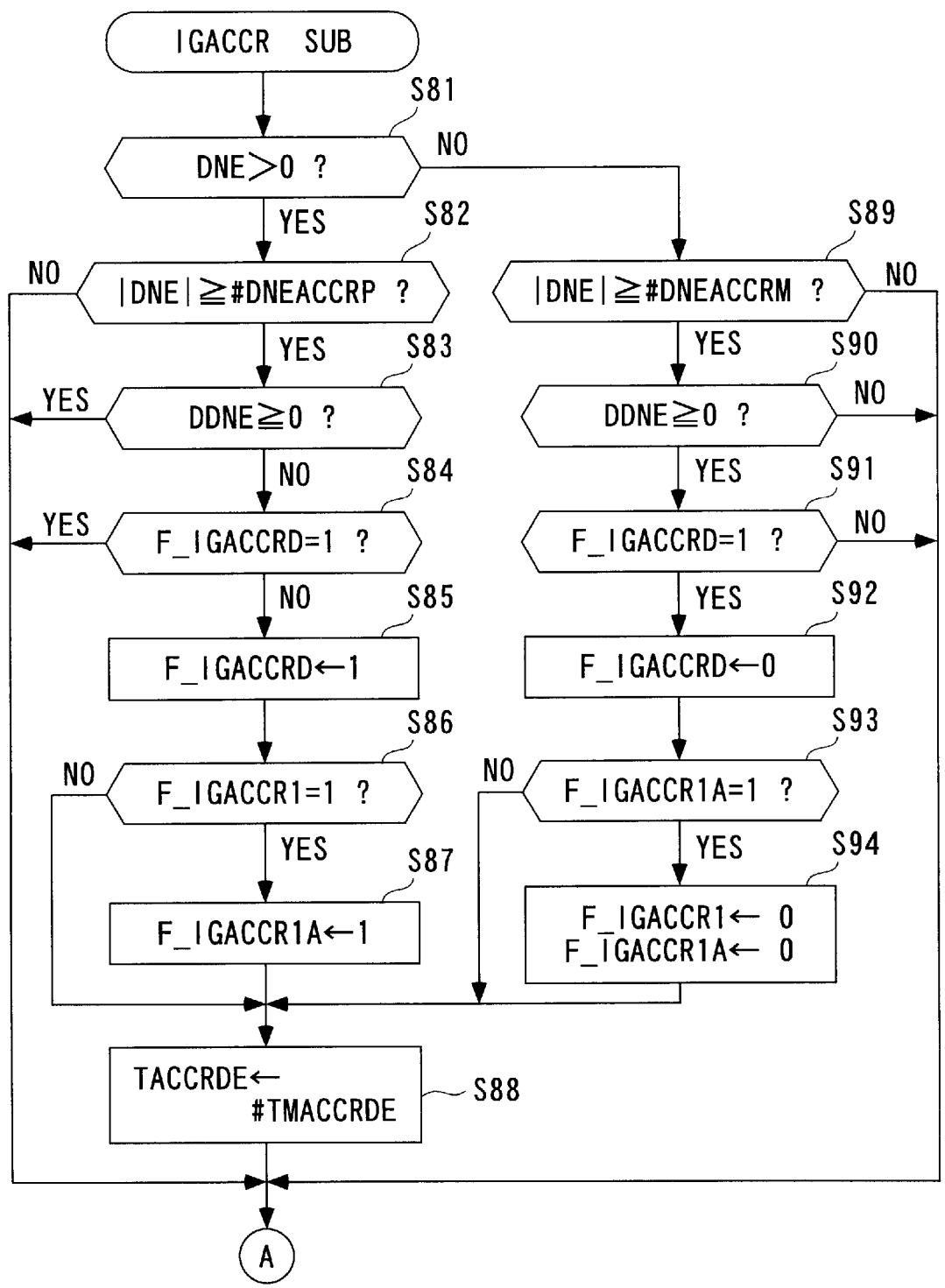
FIG. 10 is a flowchart of a subroutine for a process for calculating an acceleration-dependent retard amount IGACCR, which is executed in a step S60 in FIG. 4.

Then, when the rotational variation amount DNE is equal to or lager than the predetermined reference value #DNEACCRP, and at the same time, the rotational variation amount differential value DDNE is smaller than 0, that is, when the engine rotational speed NE is increasing and the rotational variation amount DNE has started to decrease (time t2), the acceleration-dependent retardation execution flag F_IGACCRD is set to 1 (step S84 in FIG. 10), and the acceleration-dependent retardation is executed accordingly. In other words, the acceleration-dependent retard amount IGACCR is set to the acceleration-dependent retard calculation amount IGACCRAM (step S101 in FIG. 11) and at the same time, the ignition timing IGLOG is set to a value calculated by subtracting the acceleration-dependent retard amount IGACCR from the basic ignition timing IGMAP and so forth (IGMAP+IGCRO) according to the equation (1). It should be noted that only when the acceleration-dependent retardation is executed for the first time, the first-time acceleration-dependent retardation execution flag F_IGACCR1A is set to 1, and accordingly, the acceleration-dependent retard amount IGACCR is set to an increased value obtained by multiplying the acceleration-dependent retard calculation amount IGACCRAM by the first-time correction coefficient #KIGACCR1 (step 100).

Subsequently, when DNE<0, |DNE|≧#DNEACCRM, and DDNE≧0 hold, that is, when the engine rotational speed NE is decreasing and at the same time the rotational variation amount DNE has started to increase (time t3), the acceleration-dependent retardation execution flag F_IGACCRD is set to 0 (step S92 in FIG. 10), thereby stopping the acceleration-dependent retardation.

Thereafter, whenever the acceleration-dependent retardation execution flag F_IGACCRD is switched between 1 and 0 (time t4 to time t7) in dependence on changes in the rotational variation amount DNE and the rotational variation amount differential value DDNE, the acceleration-dependent retardation is executed and stopped in an alternating fashion.

Then, the above acceleration-dependent retard control described above progressively reduces the acceleration-caused fluctuations G (of the engine rotational speed NE) to terminate the longitudinal vibrations of the vehicle, whereby when the acceleration-dependent retardation execution flag F_IGACCRD has not been inverted over the predetermined time period #TMACCRDE, the F_IGACCRD inversion timer TACCRDE is reduced to 0 (time t8), and accordingly, the acceleration-dependent retardation termination timer TACCRE is forcedly reset to 0 (step S104), whereby the acceleration-dependent retard control shifts to the termination mode. In the termination mode, unless the throttle valve 5 is suddenly opened again, the ignition timing-restoring amount #DIGACCR is repeatedly subtracted from the acceleration-dependent retard calculation amount IGACCRAM (step S103), whereby the acceleration-dependent retard amount IGACCR is progressively reduced to 0. It should be noted that during the acceleration-dependent retard control, when the operating conditions of the engine 2 leave the executing region, the acceleration-dependent retard amount IGACCR is set to 0 (step S48 in FIG. 4), whereby the acceleration-dependent retard control is immediately terminated. FIG. 2 shows a case in which the operating conditions of the engine 2 left the executing region at a time t9 during the termination mode.

As described heretofore, according to the present embodiment, when the engine throttle valve 5 is suddenly opened, on condition that the rotational variation amount DNE is equal to or larger than the predetermined reference value #DNEACCRP and at the same time the rotational variation amount differential value DDNE is smaller than 0, that is, when the engine rotational speed NE is increasing and the rotational variation amount DNE has started to decrease, the acceleration-dependent retardation is executed with the acceleration-dependent retard amount IGACCR. This makes it possible to reduce the torque of the engine 2 in the optimum timing. Therefore, the fluctuations in the vehicle-driving force which cause the acceleration-caused fluctuations G of the engine rotational speed NE can be effectively suppressed, whereby the longitudinal vibrations of the vehicle can be effectively suppressed without impairing the acceleration performance.

Further, when DNE<0, |DNE|≧#DNEACCRM, and DDNE≧0 hold, that is, when the engine rotational speed NE is decreasing and at the same time the rotational variation amount DNE has started to increase, the acceleration-dependent retardation is stopped. This makes it possible to prevent unnecessary reduction of torque of the engine 2 when the vehicle-driving force is decreasing, thereby achieving higher acceleration performance. In this case, the acceleration-dependent retardation is only stopped but no advancement of ignition timing is carried out, which positively prevents occurrence of knocking.

Further, the acceleration-dependent retard amount IGACCR is set according to the engine rotational speed NE and the gear ratio of the transmission, and further according to the throttle opening TH and the operating state of the air conditioner 22. This makes it possible to appropriately control the amount of reduction of torque of the engine 2 by the acceleration-dependent retardation according to the degree of acceleration-caused fluctuations in the engine rotational speed NE, with the result that the fluctuations in the vehicle-driving force and the longitudinal vibrations of the vehicle caused thereby can be more excellently suppressed. Further, to cope with an increase in load on the engine 2 caused by operation of the air conditioner 22, the torque of the engine 2 can be appropriately maintained.

Furthermore, during the first loop of execution of the acceleration-dependent retardation, the acceleration-dependent retard amount IGACCR is set to a larger value by using the first-time correction coefficient #KIGACCR1. This makes it possible to reduce the torque more effectively at the start of acceleration of the vehicle, whereby the longitudinal vibrations of the vehicle can be more effectively and speedily controlled to termination thereof.

It should be noted that the invention is not limited to the embodiment described above, but can be embodied in various forms. For instance, although in the above embodiment, the acceleration-dependent retard amount IGACCR is set according to the engine rotational speed NE etc., this is not limitative, but it can be further corrected according to other suitable operating parameters, such as the engine coolant temperature TW, the intake air temperature TA, and further the operating state of an accessory other than the air conditioner 22, such as the power steering. Further, although in the present embodiment, the acceleration-dependent retard amount IGACCR is set to a larger value in the first loop of execution of the acceleration-dependent retardation, this is not limitative, but if a higher priority is desired to be given to the feeling of acceleration, the acceleration-dependent retard amount IGACCR applied in the first loop can be set to a smaller value, inversely, whereby the reduction of torque at the start of acceleration of the vehicle can be lessened.

It is further understood by those skilled in the art that the foregoing is a preferred embodiment of the invention, and that various changes and modifications may be made without departing from the spirit and scope thereof.

What is claimed is:

1. An ignition timing control system for an internal combustion engine, for retarding ignition timing during acceleration, the ignition timing control system comprising:
acceleration demand-detecting means for detecting a demand of acceleration of the engine;
rotational speed-detecting means for detecting a rotational speed of the engine;
rotational variation amount-calculating means for calculating a variation amount of the rotational speed of the engine, based on the detected rotational speed of the engine;
rotational variation amount differential value-calculating means for calculating a differential value of the variation amount of the rotational speed of the engine, based on the calculated variation amount of the rotational speed of the engine;
retard amount-calculating means for calculating a retard amount for retarding the ignition timing; and
retardation execution means for executing retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

2. An ignition timing control system according to claim 1, further comprising retardation-stopping means for stopping retardation of the ignition timing by the retard amount, on condition that the variation amount of the rotational speed of the engine is smaller than the predetermined amount, and that the differential value of the variation amount of the rotational speed of the engine is larger than the predetermined value.

3. An ignition timing control system according to claim 1 or 2, wherein the engine has a transmission connected thereto, and
wherein the ignition timing control system further comprises transmission gear ratio-detecting means for detecting a transmission gear ratio of the transmission, and
wherein said retard amount-calculating means calculates the retard amount according to the rotational speed of the engine and the detected transmission gear ratio.

4. An ignition timing control system according to claim 3, wherein the engine includes a throttle valve, and an accessory driven by the engine, and
wherein the ignition timing control system further comprises throttle opening-detecting means for detecting an opening degree of the throttle valve, and accessory operating state-detecting means for detecting an operating state of the accessory, and
wherein said retard amount-calculating means calculates the retard amount further according to at least one of the opening degree of the throttle valve and the operating state of the accessory.

5. An ignition timing control system according to claim 4, wherein said retard amount-calculating means includes initial retard amount-calculating means for calculating the retard amount such that a value of the retard amount for an initial stage of execution of the acceleration-dependent retardation is made different from values of the retard amount for stages of the execution of the acceleration-dependent retardation other than the initial stage.

6. An ignition timing control system for an internal combustion engine, for retarding ignition timing during acceleration, the ignition timing control system comprising:
an acceleration demand-detecting module for detecting a demand of acceleration of the engine;
a rotational speed-detecting module for detecting a rotational speed of the engine;
a rotational variation amount-calculating module for calculating a variation amount of the rotational speed of the engine, based on the detected rotational speed of the engine;
a rotational variation amount differential value-calculating module for calculating a differential value of the variation amount of the rotational speed of the engine, based on the calculated variation amount of the rotational speed of the engine;
a retard amount-calculating module for calculating a retard amount for retarding the ignition timing; and
a retardation execution module for executing retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

7. An ignition timing control system according to claim 6, further comprising a retardation-stopping module for stopping retardation of the ignition timing by the retard amount, on condition that the variation amount of the rotational speed of the engine is smaller than the predetermined amount, and that the differential value of the variation amount of the rotational speed of the engine is larger than the predetermined value.

8. An ignition timing control system according to claim 6 or 7, wherein the engine has a transmission connected thereto, and
wherein the ignition timing control system further comprises a transmission gear ratio-detecting module for detecting a transmission gear ratio of the transmission, and
wherein said retard amount-calculating module calculates the retard amount according to the rotational speed of the engine and the detected transmission gear ratio.

9. An ignition timing control system according to claim 8, wherein the engine includes a throttle valve, and an accessory driven by the engine, and
wherein the ignition timing control system further comprises a throttle opening-detecting module for detecting an opening degree of the throttle valve, and an accessory operating state-detecting module for detecting an operating state of the accessory, and
wherein said retard amount-calculating module calculates the retard amount further according to at least one of the opening degree of the throttle valve and the operating state of the accessory.

10. An ignition timing control system according to claim 9, wherein said retard amount-calculating module includes an initial retard amount-calculating module for calculating the retard amount such that a value of the retard amount for an initial stage of execution of the acceleration-dependent retardation is made different from values of the retard amount for stages of the execution of the acceleration-dependent retardation other than the initial stage.

11. An ignition timing control method for retarding ignition timing of an internal combustion engine, during acceleration, the ignition timing control method comprising the steps of:
  detecting a demand of acceleration of the engine;
  detecting a rotational speed of the engine;
  calculating a variation amount of the rotational speed of the engine, based on the detected rotational speed of the engine;
  calculating a differential value of the variation amount of the rotational speed of the engine, based on the calculated variation amount of the rotational speed of the engine;
  calculating a retard amount for retarding the ignition timing; and
  executing retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

12. An ignition timing control method according to claim 11, further comprising the step of stopping retardation of the ignition timing by the retard amount, on condition that the variation amount of the rotational speed of the engine is smaller than the predetermined amount, and that the differential value of the variation amount of the rotational speed of the engine is larger than the predetermined value.

13. An ignition timing control method according to claim 11 or 12,
  further comprising the step of detecting a transmission gear ratio of a transmission connected to the engine, and,
  wherein the step of calculating the retard amount includes calculating the retard amount according to the rotational speed of the engine and the detected transmission gear ratio.

14. An ignition timing control method according to claim 13, further comprising at least one of the steps of detecting an opening degree of a throttle valve, and detecting an operating state of an accessory driven by the engine, and
  wherein the step of calculating the retard amount includes calculating the retard amount further according to at least one of the opening degree of the throttle valve and the operating state of the accessory.

15. An ignition timing control method according to claim 14, wherein the step of calculating the retard amount includes calculating the retard amount such that a value of the retard amount for an initial stage of execution of the acceleration-dependent retardation is made different from values of the retard amount for stages of the execution of the acceleration-dependent retardation other than the initial stage.

16. An engine control unit for an internal combustion engine, including a control program for causing a computer to perform ignition timing control of the engine to retard ignition timing thereof, during acceleration, wherein the control program causes the computer to detect a demand of acceleration of the engine, detect a rotational speed of the engine, calculate a variation amount of the rotational speed of the engine, based on the detected rotational speed of the engine, calculate a differential value of the variation amount of the rotational speed of the engine, based on the calculated variation amount of the rotational speed of the engine, calculate a retard amount for retarding the ignition timing, and execute retardation of the ignition timing by the retard amount, on condition that the demand of the acceleration is detected, that the variation amount of the rotational speed of the engine is larger than a predetermined amount, and that the differential value of the variation amount of the rotational speed of the engine is smaller than a predetermined value.

17. An engine control unit according to claim 16, wherein the program causes the computer to stop retardation of the ignition timing by the retard amount, on condition that the variation amount of the rotational speed of the engine is smaller than the predetermined amount, and that the differential value of the variation amount of the rotational speed of the engine is larger than the predetermined value.

18. An engine control unit according to claim 16 or 17, wherein the program causes the computer to detect a transmission gear ratio of a transmission connected to the engine, and when the program causes the computer to calculate the retard amount, the program causes the computer to calculate the retard amount according to the rotational speed of the engine and the detected transmission gear ratio.

19. An engine control unit according to claim 18, wherein the program causes the computer to detect at least one of an opening degree of a throttle valve and an operating state of an accessory driven by the engine, and
  wherein when the program causes the computer to calculate the retard amount, the program causes the computer to calculate the retard amount further according to at least one of the opening degree of the throttle valve and the operating state of the accessory.

20. An engine control unit according to claim 19, wherein when the program causes the computer to calculate the retard amount, the program causes the computer to calculate the retard amount such that a value of the retard amount for an initial stage of execution of the acceleration-dependent retardation is made different from values of the retard amount for stages of the execution of the acceleration-dependent retardation other than the initial stage.

* * * * *